United States Patent [19]

Fitzpatrick et al.

[11] Patent Number: 5,732,126
[45] Date of Patent: Mar. 24, 1998

[54] TELEPHONE ANSWERING OVERFLOW TO ELECTRONIC MAIL

[75] Inventors: Gregory P. Fitzpatrick, Keller; Marvin L. Williams, Lewisville, both of Tex.

[73] Assignee: International Business Machines Corporation, Armonk, N.Y.

[21] Appl. No.: 172,004

[22] Filed: Dec. 22, 1993

[51] Int. Cl.⁶ ........................................ H04M 1/65
[52] U.S. Cl. .................... 379/67; 379/89; 379/93.24
[58] Field of Search ................... 379/67, 88, 89, 379/70, 75, 279, 93.24, 100.01, 100.08

[56] References Cited

U.S. PATENT DOCUMENTS

| | | | |
|---|---|---|---|
| 4,612,416 | 9/1986 | Emerson | 379/89 |
| 4,800,583 | 1/1989 | Theis | 379/67 |
| 4,803,717 | 2/1989 | Marui | 379/67 |
| 4,837,798 | 6/1989 | Cohen et al. | 379/88 |
| 4,893,328 | 1/1990 | Peacock | 379/67 |
| 5,003,574 | 3/1991 | Denq | 379/75 |
| 5,027,384 | 6/1991 | Morganstein | 379/67 |
| 5,036,535 | 7/1991 | Gechter | 379/210 |
| 5,113,429 | 5/1992 | Morley | 379/88 |
| 5,163,082 | 11/1992 | Karnowski | 379/88 |
| 5,172,404 | 12/1992 | Hashimoto | 379/67 |
| 5,260,990 | 11/1993 | MeLampy | 379/67 |
| 5,333,266 | 7/1994 | Boaz et al. | 379/89 |
| 5,381,527 | 1/1995 | Inniss et al. | 395/200 |

FOREIGN PATENT DOCUMENTS 0 608 654 A1  3/1994  European Pat. Off. .

OTHER PUBLICATIONS

U.S. application No. 07/998,197, filed Dec. 30, 1992.
U.S. application No. 08/375,056, filed Jan. 19, 1995.
U.S. application No. 07/998,274, filed Dec. 30, 1992.
R.L. Brady and F. Jumper Unanswered Call Diverter IBM Technical Disclosure Bulletin, vol. 25, No. 7A, pp. 3480–3481, publ. Dec. 1982.

Primary Examiner—Ahmad F. Matar
Attorney, Agent, or Firm—Norman L. Gundel

[57] ABSTRACT

A method and apparatus are provided for the overflow routing of incoming telephone messages to an electronic mail inbasket. In one embodiment, the invention queries the capacity of a telephone answering system to store an audio message from an incoming telephone call for later play. Upon determining that the telephone answering system lacks the capacity to store the audio message, the invention converts the caller's audio message to text and routes the text to an electronic mail inbasket, preferably the inbasket of the intended recipient of the call.

14 Claims, 3 Drawing Sheets

TELEPHONE ANSWERING OVERFLOW TO ELECTRONIC MAIL

BACKGROUND OF THE INVENTION

1. Field of the Invention

The present invention relates in general to data processing systems and, more particularly, to telephone answering systems having limited storage capacity and data processing systems adapted to accept overflow from telephone answering systems.

2. Description of the Related Art

A telephone answering system, which may be called an answering system or an answering machine, is a data processing system that may be connected to one or more telephone lines. A telephone answering system responds to an incoming telephone call, as by playing a prerecorded message, and offers the caller the option of recording an audio message. Subsequent callers are offered the same option. A human user of the telephone answering system, called a recipient, may later play, and optionally archive or delete, some or all of the messages recorded by callers.

A data processing system may include multiple individual workstations or terminals and may be provided with an electronic mail application. An electronic mail application allows a person, called a user, who is using one such workstation or terminal, to send a mail item, such as a message or note, to another recipient at another workstation or terminal. The item is placed in the recipient's electronic inbasket, which is accessible by the recipient on the recipient's workstation. The recipient may receive a notification that a new mail item has been received by his inbasket. The recipient may open his inbasket, view the newly received item, retain the item in his inbasket, store the item in one or more notelogs or other more permanent storage, or delete the item. He may also reply to the sender of the item or forward the item to other users of the data processing system, optionally attaching additional comments of his own.

An answering system may have limited available capacity on which to record callers' audio messages, as, for example, a fixed number of messages per recipient or system wide or, in a smaller answering system, the capacity of a single audiotape cassette. Recording capacity may be measured by the answering system, as in total number of messages recorded, duration of each message recorded, or total duration of all messages recorded, either for an individual recipient or for the system as a whole. If the recording capacity that the answering system allocates to messages for the intended recipient of the incoming call is filled with previously recorded messages left by previous callers, the answering system may respond to an incoming call by playing a prerecorded message without offering the caller an option to record a message, the answering system may route the incoming call to another recipient, or the answering system may simply not respond to an incoming call.

A system is desired that will allow a caller to record a message to an alternative media of the intended recipient when a telephone answering system is unable to accept a message for the intended recipient.

SUMMARY OF THE INVENTION

In accordance with the invention, a method and apparatus are provided for the overflow routing of incoming telephone messages to an electronic mail inbasket. In one embodiment, the invention queries the capacity of a telephone answering system to store an audio message from an incoming telephone call for later play. Upon determining that the telephone answering system lacks the capacity to store the audio message, the invention converts the caller's audio message to text and routes the text to an electronic mail inbasket, preferably the inbasket of the intended recipient of the call.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
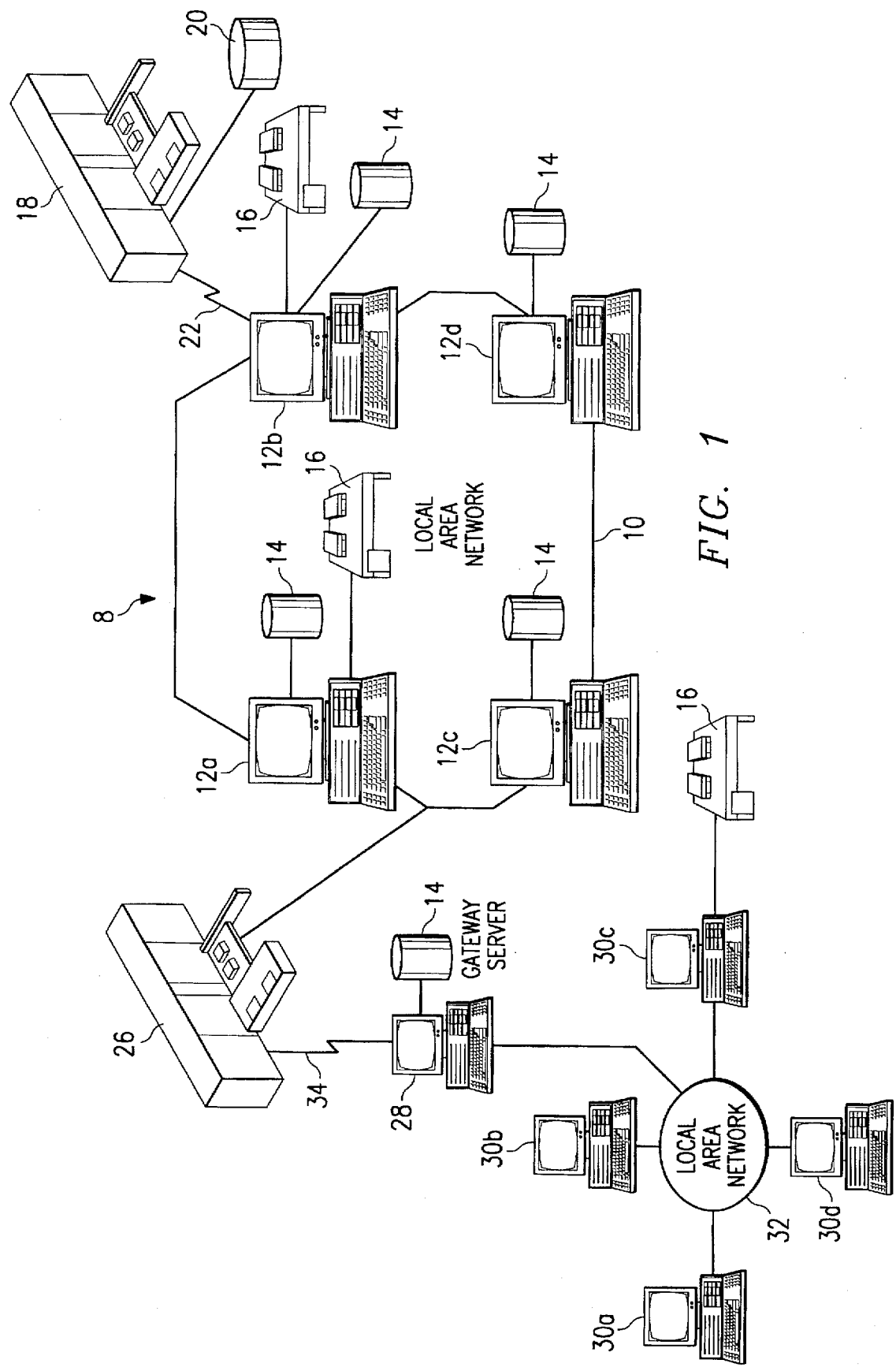
FIGS. 1 and 2 are block diagrams of apparatus used in performing the method of a preferred embodiment of the present invention and forming a part of the apparatus of a preferred embodiment of the present invention.

With reference now to the Figures, and in particular with reference to FIG. 1, there is shown a pictorial representation of a data processing system 8 which may be used to implement the method and apparatus of the present invention. As may be seen, data processing system 8 may include a plurality of networks, such as local area networks 10 and 32, each of which preferably includes a plurality of individual computers 12a, 12b, 12c, and 12d; and 30a, 30b, 30c, and 30d, respectively. Alternatively, a plurality of intelligent workstations or dumb terminals coupled to a host processor may be utilized for each such network.

Each individual computer may be coupled to a storage device 14 and/or a display printer/output device 16. One or more such storage devices 14 may be utilized to store various documents or software applications, which may be addressed by a user of each individual computer within the data processing system 8.

Still referring to FIG. 1, data processing system 8 may also include multiple mainframe computers, such as mainframe computer 18, which may be preferably coupled to local area network 10 by means of communications link 22. Mainframe computer 18 may also be coupled to a storage device 20 which may serve as remote storage for local area network 10 and may also be coupled by a communications controller 26 and communications link 34 to gateway server 28. Gateway server 28 is preferably an individual computer or intelligent workstation which serves to link local area network 32 to local area network 10.

Still referring to FIG. 1, the data processing system 8 preferably also includes an electronic mail application such as that included in IBM OfficeVision/VM (trademarks of IBM Corp.). The electronic mail application allows an individual user of the data processing system, called a sender, to compose and send an item, called an item, note or mail distribution, to one or more other users, called recipients. The item is placed in the recipient's electronic mailbox, which is accessible by the recipient on the recipient's workstation. The recipient may receive a notification that a new mail item has been received by his mailbox. The recipient may open his mailbox, view the newly received item, retain the item in his mailbox, store the item in one or more notelogs or other more permanent storage, or delete the item. He may also forward the item to other users of the data processing system, optionally attaching additional comments of his own.

Figure 2:
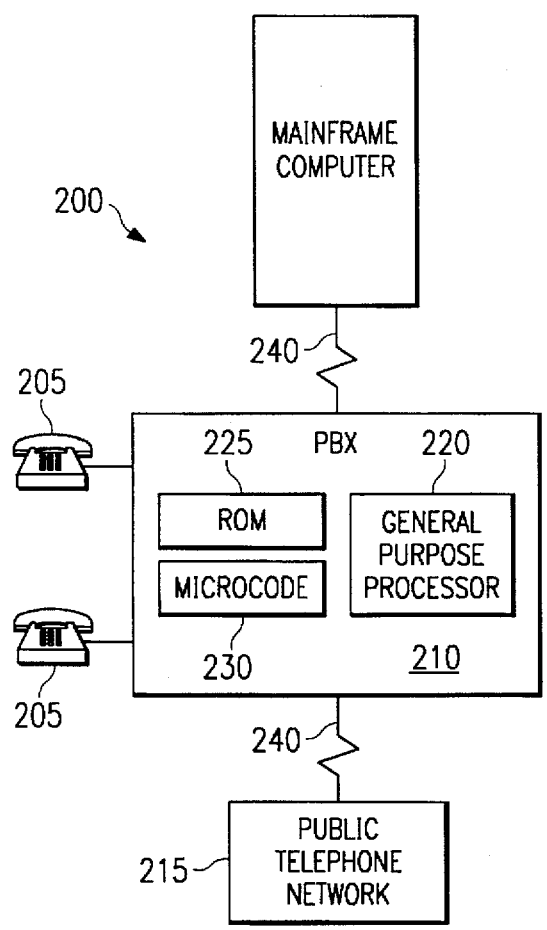

With reference now to FIG. 2, there is shown, in block diagram form, a portion of a telephone system 200 which may be used to implement the method and apparatus of the present invention. Individual telephone instruments 205 are connected to a private branch exchange (PBX) 210, which is in turn connected to a public telephone network 215. PBX 210 includes a general purpose processor 220 which includes a telephone answering system (TAS) software. Such software may reside in random access memory 225 or in microcode 230. The telephone answering software may communicate with or make requests to other general purpose computers, such as mainframe computer 18, using standard IEEE protocols, by common physical connection 240 such as dedicated coaxial cable, token ring connections or fiber optic channels.

The PBX telephone answering system responds to an incoming telephone call to a telephone instrument 205 from the public telephone network 215 or another telephone instrument 205. Ordinarily, it plays a prerecorded message and offers the caller the option of recording an audio message. Subsequent callers are offered the same option. A human user of the telephone answering system, called a recipient, may later play, and optionally archive or delete, some or all of the messages recorded by callers. In accordance with the invention, however, when the message capacity available to respond to the incoming call is reached, the telephone answering system offers the caller the option of routing a message to the recipient's electronic mail inbasket.

Figure 3:
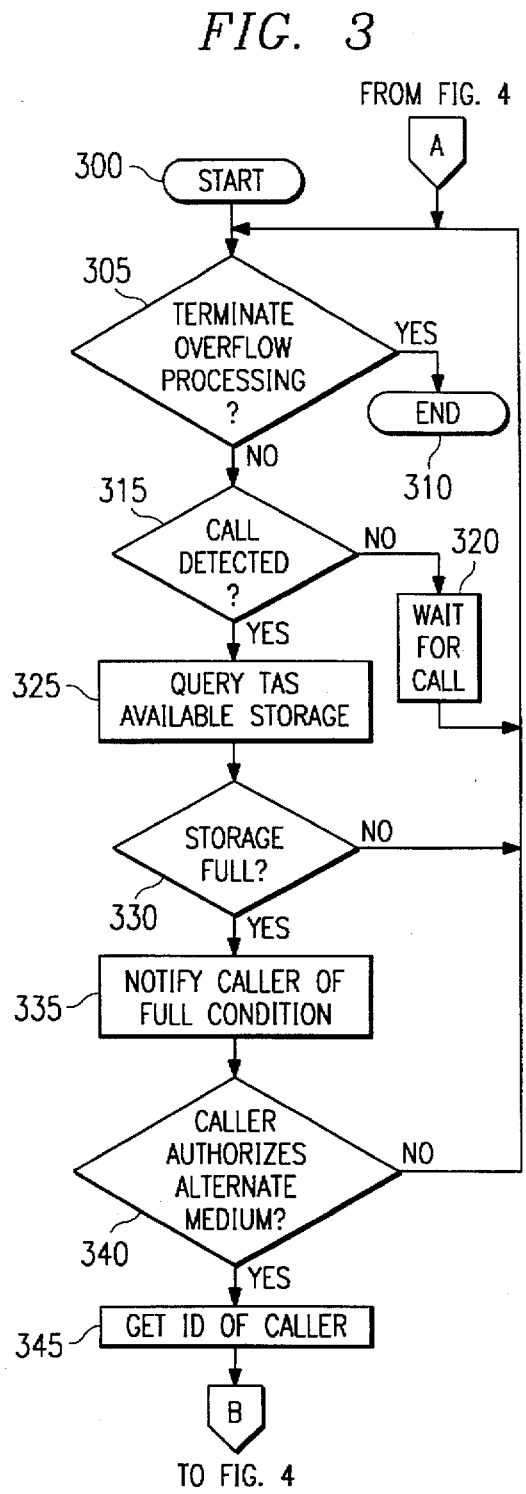
FIGS. 3 and 4 are a high level logic flowchart illustrating a preferred embodiment of the method of the present invention.
Figure 4:
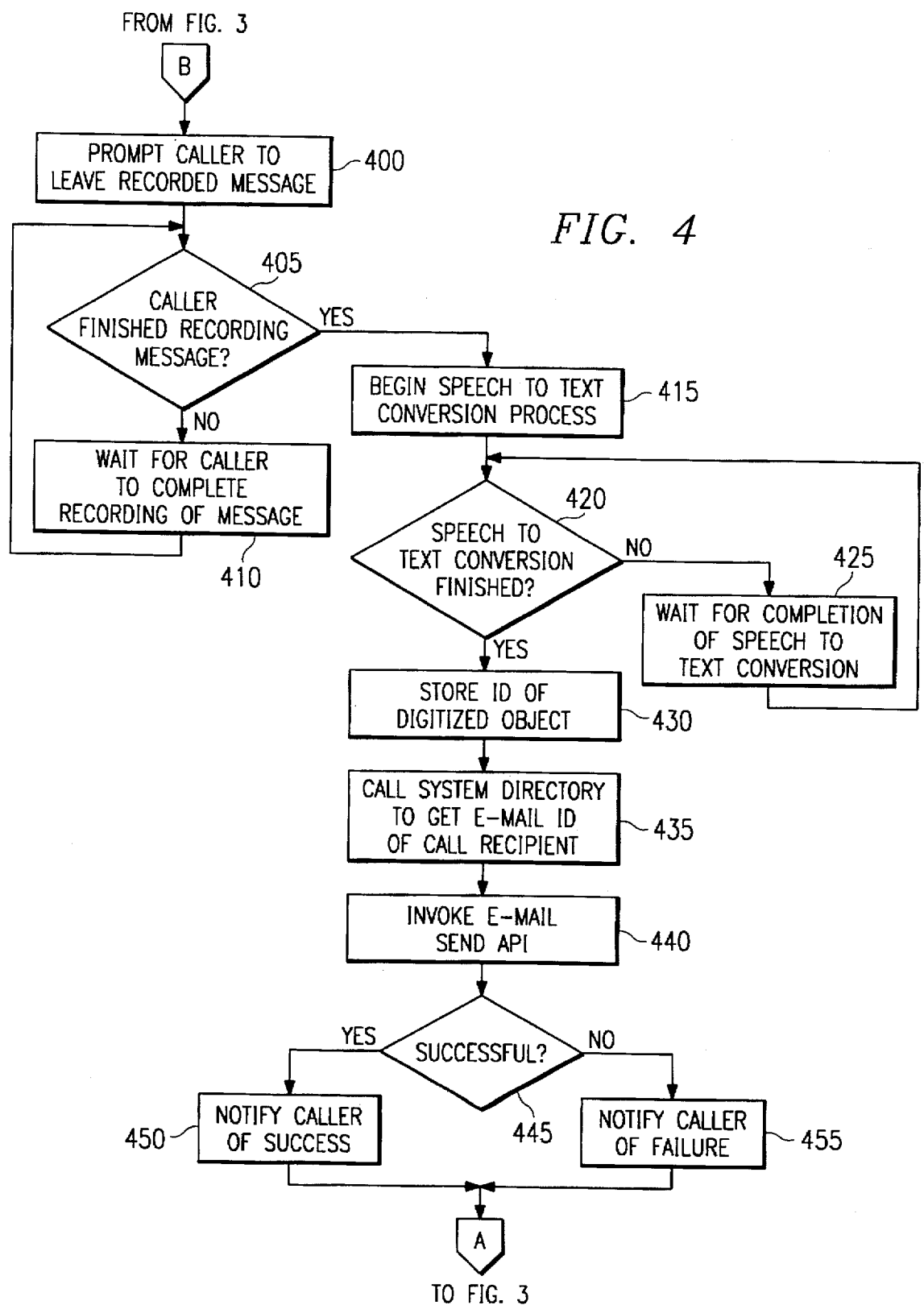

With reference now to FIGS. 3 and 4, there is depicted a high level logic flowchart which illustrates the method of a preferred embodiment of the present invention. Overflow processing begins at block 300 and proceeds to block 305 and determines whether to terminate overflow processing. Upon starting the process, overflow processing need not be terminated, and the process proceeds to block 315. If overflow processing were determined in block 305 to have been completed and ready for termination, the process would proceed to block 310 and terminate.

Returning to block 315, the process determines whether an incoming call has been detected. If no, the process proceeds to block 320 and waits for a call to be detected. When a call is detected, the process returns to block 305 above, and proceeds again to block 315.

If block 315 determines that a call has been detected, the process proceeds to block 325 and queries the remaining message storage capacity of the telephone answering system. The process then proceeds to block 330 for a determination of whether the capacity available to record a message on this line is full. If not, the process returns to block 305 to terminate overflow processing. However, if the telephone answering system's storage available to record a message on this line is determined in block 330 to be full, the process proceeds to block 335 and so informs the caller. The process then proceeds to block 340.

In block 340, the process determines from caller input whether the caller will authorize the recordation of a message by the alternate medium of the recipient's electronic mail inbasket. If not, the process returns to block 305 above to terminate overflow processing. If so, the process proceeds to block 345 and gets the ID of the caller.

The ID may be the telephone number of the caller's telephone, or a name associated with that number, as provided by a "Caller ID" service of public telephone network 215. It may be similar information maintained or provided by the PBX system 210 or by an address book application of data processing system 8 that PBX system 210 can access. It may be information input by the caller using DTMF tone dialing keys of telephone instrument 205. Or the process may proceed without any ID information being received in block 345. The process then proceeds by off page connector to block 400 of FIG. 4.

Turning now to FIG. 4, the process prompts the caller at block 400 to leave a recorded audio message. The process then proceeds to block 405 for a determination of whether the caller has finished recording the message. If not, the process proceeds to block 410 and waits for the caller to complete the recording of his message, and then proceeds back to block 405.

When block 405 determines that the caller has finished recording his message, the process proceeds from block 405 to block 415 and begins a speech to text conversion process using a suitable application such as IBM VoiceType/2 (trademark of IBM Corp.). The process then proceeds to block 420 for a determination of whether the speech to text conversion process is finished. If not, the process proceeds to block 425 to wait for the completion of the speech to text conversion, and then proceeds to back to block 420.

When block 420 determines that the speech to text conversion process is finished, the process proceeds to block 430 and stores the digitized text output of the speech to text conversion process as an electronic mail item. The process then proceeds to block 435 and accesses an electronic mail system directory or address book application to get the electronic mail address, such as a node and userid, of the call recipient. The process then proceeds to block 440 and invokes the electronic mail application's send mail application program interface and sends the newly created electronic mail item to the mail recipient's electronic mail inbasket.

The process then proceeds to block 445 to determine whether the overflow process described herein was successful. If so, the process proceeds to block 450 and notifies the caller of the success. If the process was not successful, the process proceeds to block 455 and notifies the caller of the failure. The process then proceeds from both block 450 and block 455, through an off page connector, to block 305 of FIG. 3. The process there determines to terminate overflow processing and proceeds to block 310 and terminates.

While the invention has been particularly shown and described with reference to a preferred embodiment and process, it will be understood that various changes in form and detail may be made therein without departing from the spirit and scope of the invention.

What is claimed is:

1. A method, performed in a data processing system, for receiving a verbal audio message from an incoming telephone call, the method comprising the computer implemented steps of:

in response to a determination that a telephone answering system lacks the capacity to store the verbal audio message for later audio play, converting the verbal audio message to text; and routing the text to an electronic mail inbasket.

2. The method of claim 1, further comprising the computer implemented step of querying the capacity of the telephone answering system to store the verbal audio message for later play.

3. The method of claim 2, further comprising the computer implemented step of determining whether the telephone answering system lacks the capacity to store the verbal audio message for later audio play.

4. A method, performed in a data processing system, for receiving a verbal audio message from an incoming telephone call, the method comprising the computer implemented steps of:

in response to a determination that a telephone answering system lacks the capacity to store the verbal audio message for later audio play by an intended recipient of the incoming telephone call, converting the verbal audio message to text; and routing the text to an electronic mail inbasket.

5. The method of claim 4, wherein the computer implemented step of routing the text to an electronic mail inbasket includes the computer implemented step of routing the text to an electronic mail inbasket of the intended recipient of the incoming telephone call.

6. The method of claim 4, wherein the computer implemented step of routing the text to an electronic mail inbasket includes the computer implemented step of routing the text to an electronic mail inbasket as an electronic mail item.

7. The method of claim 4, further comprising the computer implemented step of determining that the telephone answering system lacks the capacity to store the verbal audio message for later audio play.

8. A data processing system for receiving a verbal audio message from an incoming telephone call, comprising:

means for converting the verbal audio message to text in response to a determination that a telephone answering system lacks the capacity to store the verbal audio message for later audio play ; and means for routing the text to an electronic mail inbasket.

9. The data processing system of claim 8, further comprising means for querying the capacity of a telephone answering system to store the verbal audio message for later play.

10. The data processing system of claim 9, further comprising means for determining that the telephone answering system lacks the capacity to store the verbal audio message for later audio play.

11. A data processing system for receiving a verbal audio message from an incoming telephone call, comprising:

means for converting the verbal audio message to text in response to a determination that a telephone answering system lacks the capacity to store the verbal audio message for later audio play by an intended recipient of the incoming telephone call; and means for routing the text to an electronic mail inbasket.

12. The data processing system of claim 11, wherein the means for routing the text to an electronic mail inbasket includes means for routing the text to an electronic mail inbasket of the intended recipient of the incoming telephone call.

13. The data processing system of claim 11, wherein the means for routing the text to an electronic mail inbasket includes means for routing the text to an electronic mail inbasket as an electronic mail item.

14. The data processing system of claim 11, further comprising means for determining whether the telephone answering system lacks the capacity to store the verbal audio message for later audio play.

* * * * *